Figure 1:
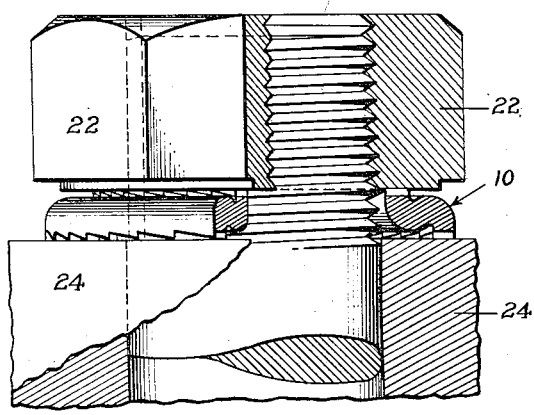

March 17, 1936.  A. STOLL  2,034,494

WASHER

Filed Dec. 4, 1934

INVENTOR
ALBERT STOLL
BY

Patented Mar. 17, 1936

2,034,494

UNITED STATES PATENT OFFICE 2,034,494

WASHER

Albert Stoll, Detroit, Mich., assignor to Clare L. Brackett, Detroit, Mich.

Application December 4, 1934, Serial No. 755,947

6 Claims. (Cl. 151—35)

This invention relates to washers for locking nuts and other threaded elements.

It is, of course, notoriously old to provide a washer having oppositely presented serrations intended to bite into the nut and work and thus lock the nut in place. However, in all such washers of which I am aware, the serrated portions thereof carry the major load and during the tightening of the nut, particularly during the final stage of this operation, the serrated portions of the washer wear or cut a sort of serration receiving annular raceway in the nut or the work, preventing the serrations from later biting into and restraining the nut when called upon to do so and in some cases, this causes the washer, even though under full pressure, to resume the relaxed form thereof, thus depriving the washer of the exercise of the resiliency so necessary for its proper functioning.

With an appreciation of the foregoing difficulties encountered with the use of serrated washers, the invention forming the subject of this application looks to an oppositely serrated washer in which the serrated portions thereof are allowed to recede coincident with compression of the washer to locations where other and major load bearing surfaces are brought into play, with the result that during the tightening of the nut, the serrations are prevented from wearing a serration receiving annular raceway in the nut which would later prevent the most advantageous functioning of the serrations and which would deprive the washer of the exercise of resiliency, under the influence of which the serrations are intended to advance and bite into the work and nut in the event of diminished nut pressure; while the recession of these serrated portions of the washer places the serrations in positions for full action should the nut or the like back up and relieve pressure on the washer, all the time maintaining, in full force, the spring tension built up in the washer during the tightening of the nut.

In speaking of the constantly maintained spring tension of the washer, even though under full load, it is pointed out that this absorbs variations in the length of the bolt due to such causes as temperature changes and thus compels the nut to remain in undisturbed position on the associated bolt, secure against the slight shifting so conducive to subsequent loosening of the nut.

The washer herein disclosed will be found to be in the nature of an annular resilient body having the inner and outer peripheral edge portions thereof serrated for engagement with the adjacent surfaces while the intervening portion of the body is provided with major load bearing mediums which upon substantial compression of the washer come into play and relieve the serrated edge portions of the washer of the major part of the load previously carried thereby, with the result that such serrated edge portions are prevented from embedding themselves in and wearing one or more annular raceways in the opposed surfaces during the tightening of the nut; it being important to observe, however, that when the washer is under substantial compression, the serrated edge portions of the washer remain in partial reserve and under full tension for nut restraining action should the pressure on the washer be relaxed.

More specifically, the washer herein disclosed contemplates an annular, constantly crouched, resilient body having the edge portions thereof presented in opposite directions and serrated to define yieldable biting annuli for engagement with the opposed surfaces while the intervening portion of the washer comprises constantly present, resilient annular undulations having crowned bearing surfaces constituting major load transmitting mediums which come into contact with the adjacent surfaces only upon substantial compression of the washer and which, as is important to observe, are in radially overlapping, close coupled relation for the transmission of the load in a line substantially perpendicular to the plane of the washer; and by reason of the close coupled, radially overlapping arrangement of these load transmitting mediums and the inherent resiliency thereof, it has been found that when the washer has been substantially compressed, the said yieldable serrated annuli will have receded to positions in partial reserve ready for full restraining action with the nut or the like in the event of diminished nut pressure; as distinguished from other oppositely serrated washers in which the bite of the serrations into the nut is increased in proportion to the pressure on the washer, wearing a serration receiving raceway in the nut or the work and causing the washer to resume the relaxed form in which the resiliency of the washer is of no avail.

Other objects and advantages will be apparent during the course of the following description.

Figure 4:
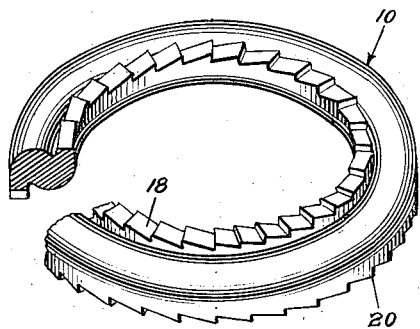
Figure 2:
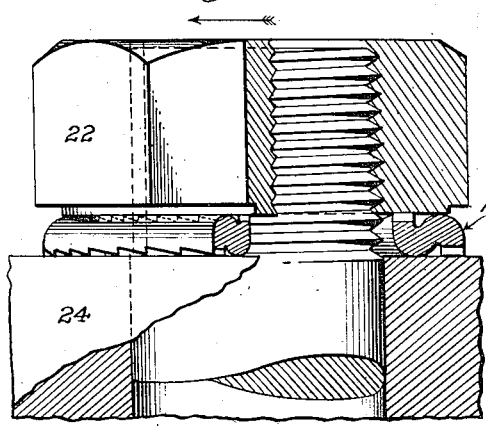
Figure 5:
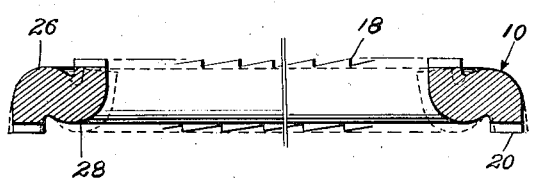
Figure 3:
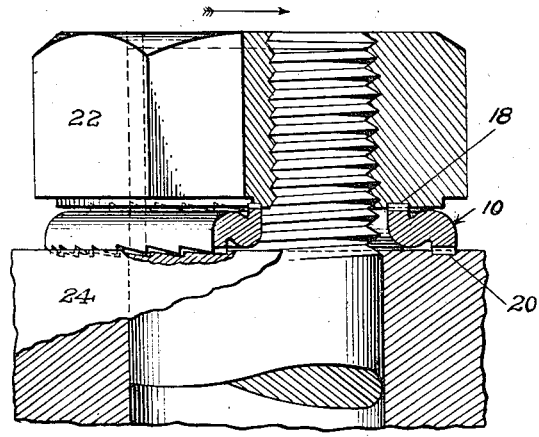
Figure 6:
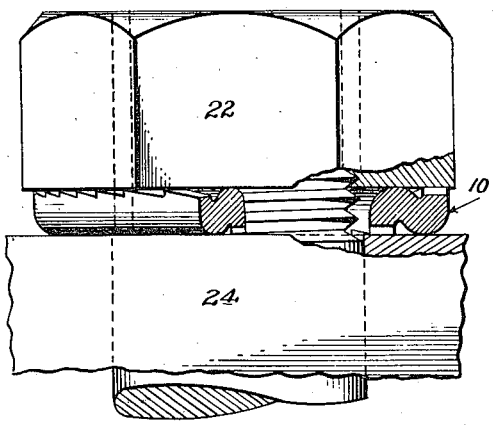

In the accompanying drawing, forming a part of this application and in which like numerals designate like parts throughout the same, Figure 1 is a side elevation of the improved washer applied, parts being in section and in the positions occupied prior to compression of the washer, Figure 2 is a similar view, the washer being under compression, Figure 3 is a similar view with the washer in the position occupied as a result of diminished pressure thereon, Figure 4 is a fragmentary perspective of the improved washer, Figure 5 is a vertical sectional view through the washer, Figure 6 is a fragmentary side elevation of the washer applied and inverted, parts being shown in section.

In the drawing, the numeral 10 generally designates a washer body in the nature of an annulus of sheet steel or other material having the inherent powers of resiliency and recovery. In other words, the invention has to do with a spring washer.

As clearly illustrated in Figures 4 and 5, the annular body 10 has the inner and outer peripheral edge portions thereof presented in opposite directions and substantially parallel to the longitudinal axis of the washer. Such longitudinal edge portions of the washer body are shown to be serrated to form annular series of ratchet teeth 18 and 20 to engage the adjacent and opposed surfaces. That is to say, the inner and outer peripheral edge portions of the body 10 are fashioned to define resilient or yieldable serrated annuli 18 and 20, respectively, for engagement with the opposed surfaces of the nut 22, or the like, and the work 24 of whatever nature the latter happens to be.

That portion of the body 10 between the serrated edge portions thereof is clearly shown in Figure 5 to be formed with a series of annular, concentric, initially and constantly present undulations 26 and 28 having, of course, constantly present crowned bearing surfaces constituting major load transmitting mediums.

Such oppositely located crowned surfaces of the undulations 26 and 28 are in close coupled or radially and axially overlapping relation to provide for the transmission of the load in a line approaching a line parallel to the longitudinal axis of the washer and by reason of the form, area and constantly maintained and available resiliency thereof exert effective locking action on the nut.

It will be seen that when the washer is relaxed or before the same has been placed under substantial compression, the serrated and yieldable annuli 18 and 20 extend beyond the planes of the crowned surfaces of the undulations 26 and 28 and that by reason of the inherent resiliency of the washer, compression of the washer will be accompanied by material recession of such serrated annuli. This, and the direction of the teeth, prevent the serrated annuli 18 and 20 from offering effective resistance to the advance of the nut 22 and possibly causing such serrated annuli to score a serration receiving raceway in the nut and thus prevent the serrations from later having effective biting engagement with the nut in the event of diminished nut pressure.

It is important to observe from Figure 2 that when the washer has been compressed, the serrated annuli 18 and 20 will have receded to positions where the same are ever ready for full action should there be a partial reduction in the pressure on the washer, all the time maintaining the crouched washer form and accumulated tension that is so important to the locking action of the invention.

With the washer compressed and still in the ever present crouched and tensioned form as suggested in Figure 2, the relatively broad and crowned surfaces of the undulations 26 and 28 carry the major load, leaving the serrated annuli 18 and 20 in partial reserve for restraining and biting engagement with the opposed surfaces in the event of diminished pressure on the washer. At this point, it might be noted that by reason of the ratchet form of the serrated annuli 18 and 20, there will be no appreciable scoring of the nut or the work as a result of the advance of the nut.

When the washer is under full compression, as shown in Figure 2, the relatively broad bearing surfaces of the load transmitting corrugations and the close coupled or radially overlying arrangement of such surfaces will, together with the inherent strength of the washer, resist further compression and in this way the tension built up in the washer is sustained, first, for securing the nut against the slight shifting that may later result in loosening of the nut and, second, to cause the serrations to advance should there be a backing up of the nut.

In Figure 2 it is illustrated that when the washer is under full compression, the serrated annuli 18 and 20 will occupy slightly canted positions with reference to the surfaces engaged thereby, while from Figure 3 it will be seen that should there be diminished pressure on the washer, such annuli 18 and 20 are allowed to advance and bite squarely into the surfaces of the nut and the work so as to hold the nut against further backing up.

In summarizing, it will be seen that the improved washer is in the nature of an annular resilient body provided at points spaced inwardly of the edges thereof with one or more annular, immediately meeting corugations having axially and radially overlapping, oppositely presented crowned surfaces defining major load transmitting mediums for the transmission of the washer load in a line substantially parallel to the longitudinal axis of the washer, while the edge portions of the annular body are immediately joined with the outer extremities of the corrugations and are directed axially to define separate annuli serrated at the outer edges thereof and initially projecting beyond the planes of the crowned surfaces for engagement with the nut and the work, the inherent resiliency of the annular body allowing the serrated annuli to recede coincident with the tightening of the nut to points where the major load is borne by the constantly present corrugations in which spring energy has been stored. In addition, the undulated or corrugated portion of the washer has a power approximating the force exerted by the nut so that nut pressure causes only slight, if any, yielding of the corrugations.

Finally, by reason of the structure of the washer, particularly the firm support afforded the yieldable portion thereof, the washer may be used on a number of different occasions without damage thereto or change in form.

As illustrated in Figure 6, the washer may, if desired, be reversed so that the outer serrated annulus 20 is presented to the nut while the inner serrated annulus 18 is presented to the work 24.

Having thus described the invention, what is claimed is:

1. In an axially compressible washer, an annular resilient body formed between an inwardly of the inner and outer peripheral edge portions thereof with meeting, constantly present, resilient corrugations giving the annular body a constantly crouched form in cross section and defining radially curved overlapping crowned major load transmitting surfaces, the inner and outer edge portions of the annular body being extended axially and formed with ratchet teeth initially projecting beyond the said radially curved major load transmitting surfaces for engagement with a nut and adjacent work, the said edge portions of the annular body being axially yieldable under the force exerted by the nut, thereby allowing the radially curved crowned surfaces of the constantly present corrugations to have load transmitting contact with the nut and the work and placing the ratchet teeth in partial reserve for advance and biting into the nut and the work under the influence of the inherent power of the resilient corrugations in the event of relaxed nut pressure on the washer.

2. In an axially compressible spring washer for use in connection with nuts, an annular resilient body provided between the inner and outer edges thereof with resilient annular, constantly present undulations defining oppositely directed, constantly present crowned bearing surfaces between the inner and outer edges of the washer, the said constantly present crowned bearing surfaces being in axially overlapping relation and thus constituting crowned load transmitting mediums when the washer is compressed, the inner and outer edge portions of the annular body being joined directly with said undulations and projecting axially in opposite directions and formed with edge portions initially projecting beyond the constantly present crowned surfaces and having annular series of serrations for engagement with a nut and adjacent work, the said edge portions of the annular body being yieldable under nut pressure to tension the immediately connected undulation and thereby place the serrations in partial reserve for advance into biting engagement with the nut and the work in the event of diminished nut pressure and allowing the nut and the work to have pressure engagement with the said overlapping crowned load transmitting surfaces of the undulation.

3. In an axially compressible washer, an annular resilient body provided with resilient, oppositely presented, axially extending surface engaging serrated annuli, the body also being formed with constantly present annular undulations having a power superior to that of said resilient annuli and having radially and axially overlapping crowned surfaces constituting major load transmitting mediums when the washer is under full pressure, thereby maintaining the serrated annuli in partial reserve for full action upon diminished pressure on the washer, said annuli being extended axially beyond the said adjacent crowned surfaces when the washer is relaxed.

4. In an axially compressible washer for use in connection with nuts, an annular body provided with oppositely directed, axially extending annuli having ratchet teeth for engagement with a nut and adjacent work, said annular body being provided with a constantly present yieldable corrugation giving the annular body a constantly crouched form in cross section and defining radially and axially overlapping crowned nut and work engaging surfaces for the axial transmission of pressure through the body, the ratchet teeth of the said yieldable annuli being initially extended beyond the said crowned surfaces and being retractable upon the advance of the nut to positions substantially flush with the said crowned surfaces and in partial reserve for advance and biting engagement with the nut and the work in the event of diminished pressure on the washer, said corrugation having an inherent power of resistance approximating that of the nut.

5. In an axially compressible washer, an annular resilient body having oppositely directed surface engaging serrated edge portions and intervening, constantly present, resilient annular undulations having radially overlapping crowned bearing surfaces constituting major load transmitting mediums when the washer is under full pressure, thereby maintaining the surface engaging serrated edge portions in partial reserve for action upon diminished pressure on the washer.

6. In an axially compressible washer, an annular resilient body having oppositely directed surface engaging serrated edge portions and intervening resilient annular undulations having radially overlapping crowned bearing surfaces constituting major load transmitting mediums when the washer is under full pressure, thereby maintaining the surface engaging serrated edge portions in partial reserve for action upon diminished pressure on the washer, said surface engaging serrated edge portions being extended beyond the adjacent crowned surfaces when the washer is relaxed.

ALBERT STOLL.